Sept. 29, 1970  E. NEMETH  3,530,709
MACHINE FOR TESTING THE TENSILE STRESS
RESISTANCE OF A WORKPIECE
Filed Oct. 22, 1968  2 Sheets-Sheet 1
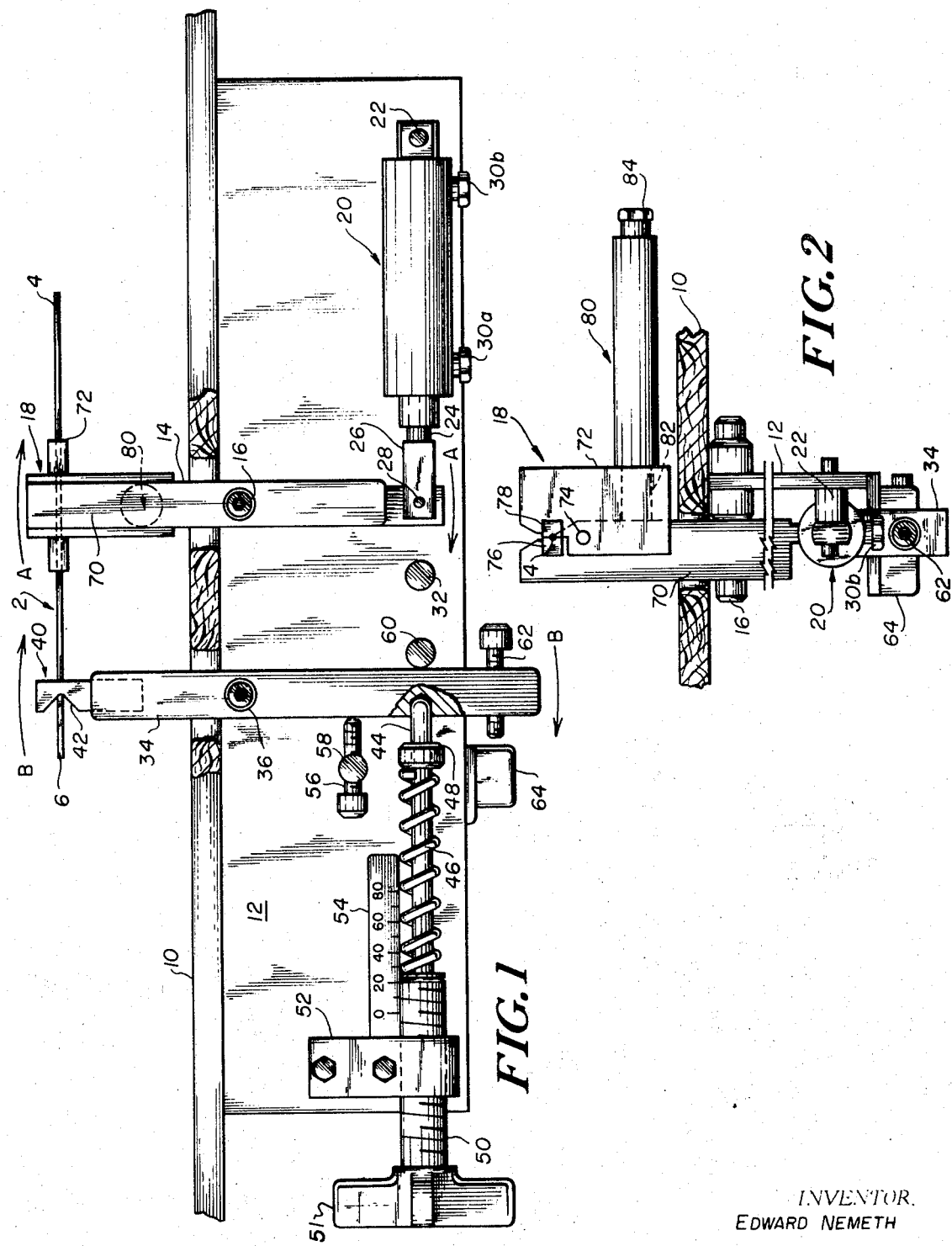
INVENTOR.
EDWARD NEMETH
BY
ATTORNEYS Sept. 29, 1970   E. NEMETH   3,530,709
MACHINE FOR TESTING THE TENSILE STRESS
RESISTANCE OF A WORKPIECE
Filed Oct. 22, 1968   2 Sheets-Sheet 2

INVENTOR.
EDWARD NEMETH

BY

Lane, Aitken, Dunner & Ziems
ATTORNEYS

ÜUnited States Patent Office 3,530,709
Patented Sept. 29, 1970

3,530,709
MACHINE FOR TESTING THE TENSILE STRESS RESISTANCE OF A WORKPIECE
Edward Nemeth, 13—08 Morlot Ave., Fair Lawn, N.J. 07410
Filed Oct. 22, 1968, Ser. No. 769,642
Int. Cl. G01n 3/08
U.S. Cl. 73—95                                  4 Claims

ABSTRACT OF THE DISCLOSURE

A machine for testing the tensile stress resistance of a workpiece, wherein the workpiece is secured between a pair of movable levers and one of the levers is moved in a direction away from the other to exert a gradually increasing tensile stress on the workpiece. The other lever is restrained from movement in the same direction until a predetermined tensile stress is exerted on the workpiece.

BACKGROUND OF THE INVENTION

This invention relates to a testing machine and, more particularly, to a machine for testing the tensile stress resistance of a workpiece.

The need for ascertaining the tensile stress resistance of a workpiece, such as an electrical conductor, a rope, or a string, etc., often is highly desirable. For example, in the use of electrical conductors having a terminal crimped to one end thereof, it is desirable to test the resistance of the connection to tensile stresses before placing the conductor in use. Heretofore this type of testing had to be done by an operator exerting a manual pull between the terminal and the conductor to see if the connection would withstand the pull. Of course, this manual pull varied between operators, and, therefore, no accurate determination of the stress resistance of the workpiece was available.

SUMMARY OF THE INVENTION

It is therefore an object of the present invention to provide an apparatus for testing the tensile stress resistance of a workpiece, and, more particularly, to such an apparatus which can quickly and precisely determine whether the tensile resistance of the workpiece is within predetermined limits.

Briefly summarized, the testing machine of the present invention comprises a pair of levers movably mounted with respect to a support member, and adapted to receive the workpiece therebetween, means to move one of said levers in a direction away from the other to exert a gradually increasing tensile stress on said workpiece, and means to restrain said other lever from movement in said direction until a predetermined tensile stress is exerted on said workpiece.

BRIEF DESCRIPTION OF THE DRAWINGS

Reference is now made to the accompanying drawings for a better understanding of the nature and objects of the testing machine of the present invention, which drawings illustrate the best mode presently contemplated for carrying out the objects of the invention and its principles, and are not to be construed as restrictions or limitations on its scope. In the drawings:

FIG. 1 is a front elevational view of the testing machine of the present invention with the horizontal support member being shown in section;

FIG. 2 is a side elevational view of the testing machine of the present invention with the horizontal support member being shown in section.

DESCRIPTION OF THE PREFERRED EMBODIMENTS

Figure 3:
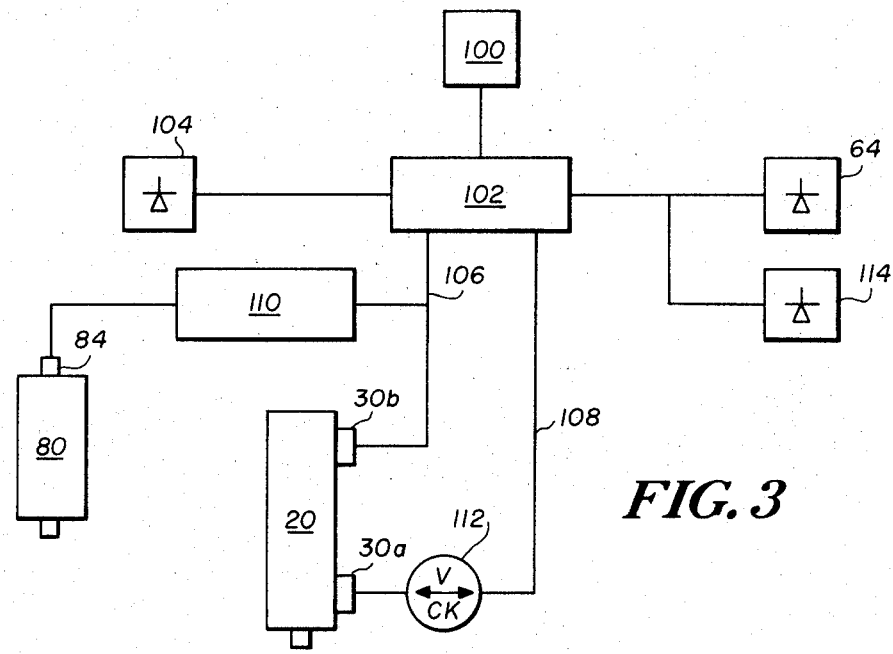
FIGS. 3 and 4 are diagrammatic views showing two air flow systems which may be used with the machine of the present invention.

Referring specifically to FIGS. 1 and 2 of the drawings, the machine of the present invention is shown adapted to test the tensile strength resistance of a workpiece 2 which includes an electrical conductor 4 having a terminal 6, of any known type, crimped to one end thereof. The machine includes a support member 10 which may be in the form of a horizontal bench, or the like, having a vertical support member 12 extending downwardly therefrom. A lever 14 extends through a hole formed in the support member 10 and is pivotably mounted about a pin 16 fixed to the support member 12. A clamping assembly 18 for clamping the conductor 4 is fixed at one end of the lever 14, and will be discussed in detail later.

An air cylinder 20 is fixed, by means of a bolt 22, to the support member 12 and includes a rod 24 which extends outwardly from the cylinder and which is adapted to reciprocate with respect thereto. A bifurcated connecting member 26 is disposed at the free end of the rod 24 and is pivotably mounted on the other end of the lever 14, via a pin 28. A pair of connecting members 30a and 30b are provided near each end of the cylinder 20 and are adapted to be connected to suitable air flow lines to permit the flow of air into and from each end of the cylinder to reciprocate the rod, as will be described in detail later. A stop pin 32 is mounted on the support member 12 and is adapted to limit the pivotable movement of the lower end of the lever 14 as a result of the reciprocation of the rod 24.

A second lever 34 extends through another hole formed in the support member 10 and is pivotably mounted about a pin 36 fixed to the support member 12. The upper end portion of the lever 34 is provided with a catch assembly 40 which includes a vertical slot (not shown) through which the terminal 6 of the workpiece can be moved into a position whereby it engages in a apex of a notch 42 formed in the catch assembly 40, to restrain the workpiece from movement in a left-to-right direction with respect to the catch assembly as viewed in FIG. 1.

A rod 44 engages in a notch formed in the lower end of the lever 34 and is urged into this notch with a predetermined amount of force by means of a spring 46 which extends over the rod between a flange 48 formed on the rod and a bolt member 50 through which the rod extends. The bolt member 50 is externally threaded for reciprocal movement with respect to a support 52 mounted to the support member 12 and having an internally threaded opening for receiving the bolt member. It follows that, upon rotation of the handle 51 fixed to the bolt member 50, the latter moves axially with respect to the support 52, which movement varies the load exerted by the spring on the rod 44 and therefore on the bottom end of the lever 34. An indicator 54 is mounted on the support member 12 and is calibrated to indicate the amount of load applied to lever 34 by the spring 46.

A stop pin 56 is adjustably threaded through a pin 53 fixed to the support member 12, and is adapted to adjustably limit the pivotal movement of the lever 34 in one direction, while a fixed stop pin 60, also mounted on the support member 12, limits the pivotal movement of the lever in the other direction.

An adjustable pin 62 is threaded through the bottom portion of the lever 34, and is adapted to engage an air flow control member 64 upon a predetermined amount of pivotal movement of the bottom portion of the lever 34 in a direction indicated by the arrows B in FIG. 1, as will be described in detail later.

Referring specifically to FIG. 2, the clamping assembly 18 comprises a fixed clamping member 70 secured to the upper end of the lever 14 and a pivotal clamping member 72 adapted to pivot with respect to the fixed clamping member 70 about a pin 74. A pair of jaws 76 and 78 are provided on the clamping members 70 and 72, respectively.

An air cylinder 80 is fixed to the pivotal clamping member 72 and includes a reciprocating rod 82 adapted to engage a side of the clamping member 70, so that reciprocal movement of the rod 82 with respect to the cylinder 80 causes a corresponding pivotal movement of the clamping member 72 with respect to the clamping member 70. A connection 84 is provided at the free end of the cylinder 80 for connecting to an air flow line through which pressurized air is passed to control the above reciprocal movement.

In operation, the conductor 4 of the workpiece 2 is placed between the clamping jaws 76 and 78 of the clamping assembly 18, and the terminal 6 is placed in the catch assembly 40. Pressurized air is then admitted into the cylinder 80 through the connection 84, and into the cylinder 20 through the connection 30b, which causes the jaw 78 to move into a clamping engagement with the conductor 4, and the rod 24 to move to the left as viewed in FIG. 1, respectively. This latter movement, in turn, causes the workpiece 2 to be secured between the levers 14 and 34, and the lever 14 to pivot in a direction indicated by the arrows A in FIG. 1, respectively, which causes a gradually increasing tensile stress to be applied to the workpiece 2 due to the fact that the lever 34 is normally restrained from movement by means of the load applied to its lower end by the compressed spring 46 acting on the rod 44.

Assuming that the bolt 50 has been axially adjusted with respect to the support member 52 so that it exerts a predetermined load of 20 pounds, for example, on the rod 44, the lever 34 will begin to pivot slightly in the direction indicated in the arrows B in FIG. 1 as soon as a corresponding amount of tensile stress is applied to the workpiece 2 by movement of the lever 14. This slight pivoting of the lever 34 causes the pin 62 to engage, and therefore actuate, the flow control member 64. Upon the latter occurring, the flow control member 64 is adapted to reverse the flow of the pressurized air from connection 30b into connection 30a of the air cylinder 20, thus moving the rod 24 in a direction to the right as shown in FIG. 1, and thereby relieving the tensile stress on the workpiece 66. Thus assuming the workpiece did not break, the above operation determines that the tensile stress resistance of the workpiece will withstand the predetermined load of 20 pounds.

If, however, during the above operation the workpiece did, in fact, break before the predetermined load exerted by the rod 44 on the lever 34 is overcome, the workpiece is rejected, and the apparatus is reset for testing another workpiece, in a manner that will be described in detail later.

A flow diagram of an air flow system which may be used in conjunction with the above is shown with reference to FIG. 3. Specifically, an air source 100 supplies air at a predetermined pressure to a main valve 102, which, when activated by a starter switch 104, controls the flow of air through the passage 106 to the cylinder 20 via the connection 30b, and to the cylinder 80 via the connection 84. As described above, this causes the rod 24 of the cylinder 20 to move to the left as viewed in FIG. 1, and the rod 82 of the cylinder 80 to move to the left as viewed in FIG. 2. The former movement causes exhaust air to flow through the connection 30a of the cylinder 30 and through a line 108 into the main valve, and the latter movement causes air to exhaust through an exhaust hole (not shown) in the other end of the cylinder 80.

When the load exerted on the lever 34 by the lever 14, via the workpiece 2, exceeds the load applied to the bottom end of the lever 34, the pin 62 will engage and actuate the air flow control member 64 as described above, which, in turn, causes the main valve 102 to reverse the flow of air to and from the cylinder 20 via the passages 106 and 110, and the connections 30b and 30a, in a known manner. This will cause the rod 24 to move to the right as viewed in FIG. 1, and exhaust air to flow out of the cylinder through the connection 30b, through the passage 106 and to the main valve. Since the rod 82 of the air cylinder 80 may be spring loaded in a known manner to effect its return movement to the right as viewed in FIG. 2, an exhaust passage is not needed for this system.

A regulator 110 may be provided between the main valve 102 and the cylinder 30 and a flow control valve 112 may be provided in the passage 110 between the main valve 102 and the load cylinder 20 in order to exert control over the fluid in a known manner, if necessary.

In the event the workpiece breaks before the predetermined load is overcome, a reset switch 114 is provided in parallel with the air flow control member 64, which permits a manual actuation of the main valve 102 to reverse the flow of fluid into and from the cylinders 20 and 80, as described above.

Figure 4:
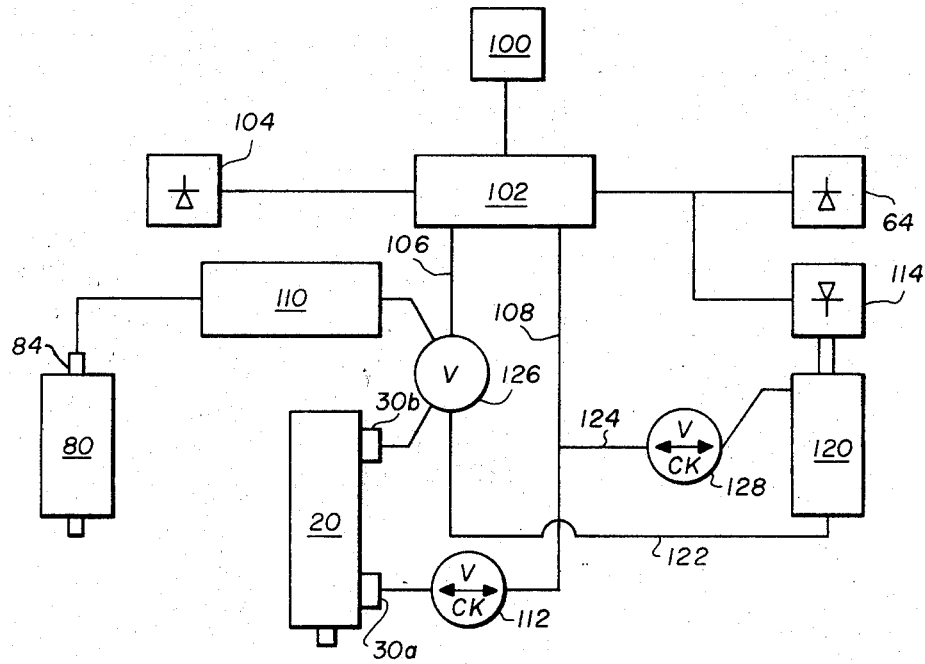

The air flow system of FIG. 4 is similar to that of FIG. 3 with the addition of an air cylinder 120, a pair of passages 122 and 124, a pressure responsive valve 126 disposed in the passage 122, and a flow control valve 128 disposed in the passage 124. The pressure responsive valve 126 is responsive to the increase in the pressure in the line 106 occurring when the cylinders 20 and 80 reach the end of their drive strokes in response to the workpiece breaking prior to the predetermined load being overcome, and the latter valve will then permit pressurized fluid to flow through the line 122 to drive the rod of the cylinder 120 into engagement with the reset switch 114, which thus provides an automatic resetting of the apparatus in response to a premature failure of the workpiece.

It is thus seen that the apparatus of the present invention provides a very quick and precise way of testing the tensile stress resistance of a workpiece without resorting to the inherent errors present when one individual attempts to manually test workpieces throughout a relatively long period of time.

It is apparent that several variations of the above apparatus may be made without departing from the scope of the invention. For example, the testing apparatus is not limited to testing the crimp tensile stress resistance of a terminal mounting on a conductor, but rather can be used to test many types of similar workpieces, such as, ropes, wires, strings, etc., in which case the clamping assembly and/or the retaining assembly discussed above, may be changed accordingly. Also the cylinder assemblies may be operated by any type of fluid other than air, in accordance with known techniques and may utilize additional flow control valves, etc., to provide the desired movement of the air cylinders in accordance with the above.

Of course, other variations of the specific construction and arrangements of the testing machine disclosed above can be made by those skilled in the art without departing from the invention as defined in the appended claims.

What is claimed is:

1. An apparatus for testing the tensile stress resistance of a workpiece, said apparatus comprising a support member, a pair of levers pivotably mounted with respect to said support member, said workpiece extending between said levers and secured to each lever near one end thereof, means to pivot one of said levers in a direction so that said one end thereof moves away from said one end of the other lever to exert a gradually increasing tensile stress on said workpiece, a precompressed resilient member engaging said other lever and exerting a predetermined force thereon to restrain said other lever from pivotal movement in said direction until a predetermined tensile stress is exerted on said workpiece, and means responsive to said tensile stress overcoming said predetermined force for deactivating said means to pivot one of said levers.

2. An apparatus for testing the tensile stress resistance of a workpiece, said apparatus comprising a support member, a pair of levers pivotably mounted with respect to said support member, said workpiece extending between said levers and secured to each lever near one end thereof, means to pivot one of said levers in a direction so that said one end thereof moves away from said one end of the other to exert a gradually increasing tensile stress on said workpiece, a precompressed resilient member engaging said other lever and exerting a predetermined force thereon to restrain said other lever from pivotal movement in said direction until a predetermined tensile stress is exerted on said workpiece, and means to vary the precompression of said resilient member.

3. An apparatus for testing the tensile stress resistance of a workpiece, said apparatus comprising a support member, a pair of levers pivotably mounted with respect to said support member, said workpiece extending between said levers and secured to each lever near one end thereof, means to pivot one of said levers in a direction so that said one end thereof moves away from said one end of the other lever to exert a gradually increasing tensile stress on said workpiece, a precompressed resilient member engaging said other lever and exerting a predetermined force thereon to restrain said other lever from pivotal movement in said direction until a predetermined tensile stress is exerted on said workpiece, and means for indicating the amount of precompression of said resilient member.

4. An apparatus for testing the tensile stress resistance of a workpiece, said apparatus comprising a support member, a pair of levers pivotably mounted with respect to said support member, said workpiece extending between said levers and secured ot each lever near one end thereof, a fluid operated cylinder assembly having a rod member operatively connected to the other end of one of said levers and a cylinder adopted to receive pressurized fluid to drive said rod member and exert a force on said other end of said one lever so that said one lever pivots in a direction whereby said one end thereof moves away from said one end of the other lever to exert a gradually increasing tensile stress on said workpiece, and means to restrain said other lever from pivotal movement in said direction until a predetermined tensile stress is exerted on said workpiece, a clamping assembly for securing said workpiece to one of said levers, said clamping assembly having a fixed clamping member and a movable clamping member, an additional fluid operated cylinder assembly operatively connected to said movable clamping member and adopted to reciprocate said movable clamping member to and from a clamping position with respect to said fixed clamping member, a common source of pressurized fluid for said cylinder assemblies, and means for selectively distributing said fluid to said assemblies.

References Cited

UNITED STATES PATENTS

| | | | |
|---|---|---|---|
| 2,782,635 | 2/1957 | Knight | 73—95 |
| 3,318,142 | 5/1967 | Shoemaker | 73—95 |
| 3,323,357 | 6/1967 | Gloor | 73—103 |

JERRY W. MYRACLE, Primary Examiner

U.S. Cl. X.R.

73—103